United States Patent
Mills

(10) Patent No.: US 8,381,399 B2
(45) Date of Patent: Feb. 26, 2013

(54) ADAPTIVE RE-USE OF WASTE INSULATED GLASS WINDOW UNITS AS THERMAL SOLAR ENERGY COLLECTION PANELS

(76) Inventor: Gregory B. Mills, Kansas City, KS (US)

(*) Notice: Subject to any disclaimer, the term of this patent is extended or adjusted under 35 U.S.C. 154(b) by 558 days.

(21) Appl. No.: 12/652,633

(22) Filed: Jan. 5, 2010

(65) Prior Publication Data

US 2010/0170092 A1 Jul. 8, 2010

Related U.S. Application Data

(60) Provisional application No. 61/204,338, filed on Jan. 5, 2009.

(51) Int. Cl.
  *E06B 3/26* (2006.01)
(52) U.S. Cl. ............ 29/890.033; 29/401.1; 29/890.032; 29/426.1
(58) Field of Classification Search ............ 29/890.032, 29/890.033, 890.034, 890.04, 401.1, 897.32, 29/897.3, 402.01, 402.02, 402.03, 426.1, 29/426.2
  See application file for complete search history.

(56) References Cited

U.S. PATENT DOCUMENTS

| | | | |
|---|---|---|---|
| 1,753,227 A | 4/1930 | Wheeler et al. | |
| 1,801,710 A | 4/1931 | Abbott | |
| 1,802,635 A | 4/1931 | Eaton | |
| 1,951,403 A | 3/1934 | Goddard | |
| 1,971,242 A | 8/1934 | Wheeler | |
| 2,202,756 A | 5/1940 | Cline | |
| 2,756,467 A * | 7/1956 | Etling | 428/34 |
| 4,055,163 A | 10/1977 | Costello et al. | |
| 4,062,351 A | 12/1977 | Hastwell | |
| 4,098,265 A | 7/1978 | Gravely | |
| 4,099,517 A | 7/1978 | McRae | |
| 4,141,341 A | 2/1979 | Eby | |
| 4,158,355 A | 6/1979 | Spitzer | |
| 4,159,700 A | 7/1979 | McCrum | |
| 4,159,708 A | 7/1979 | Pyle | |
| 4,170,984 A | 10/1979 | Scheffee | |
| 4,197,833 A | 4/1980 | Pelish | |
| 4,227,514 A | 10/1980 | Spitzer | |
| 4,296,740 A | 10/1981 | Meckler | |
| 4,300,532 A | 11/1981 | Olsen | |
| 4,421,663 A | 12/1983 | Embree et al. | |
| 4,426,995 A | 1/1984 | Wilson | |
| 4,450,660 A * | 5/1984 | Dean et al. | 52/202 |
| 5,454,893 A * | 10/1995 | Dietz | 156/104 |
| 5,596,981 A | 1/1997 | Soucy | |
| 6,270,836 B1 | 8/2001 | Holman | |
| 2006/0272171 A1 | 12/2006 | Ferracuti | |
| 2007/0084460 A1 | 4/2007 | Beckman | |
| 2008/0047547 A1 | 2/2008 | Jona et al. | |

* cited by examiner

*Primary Examiner* — David Bryant
*Assistant Examiner* — Christopher Besler
(74) *Attorney, Agent, or Firm* — Law Office of Mark Brown, LLC; Mark E. Brown; Christopher M. DeBacker

(57) ABSTRACT

A method of repurposing dual-paned insulated glass window units (IGUs) that would otherwise be put to waste into thermal solar panels capable of generating hot water for a residence or other structure. The method includes the steps of removing an existing IGU, disassembling and cleaning the IGU, and reassembling the IGU with a new silicon seal and fluid channels for connection to a looped solar heating system. The space between the panes may be filled with a liquid to be heated by solar radiation, or alternatively by a conduit which transports the liquid through the panel.

9 Claims, 4 Drawing Sheets

ADAPTIVE RE-USE OF WASTE INSULATED GLASS WINDOW UNITS AS THERMAL SOLAR ENERGY COLLECTION PANELS

CROSS REFERENCE TO RELATED APPLICATION

This application claims priority in provisional application No. 61/204,338, filed Jan. 5, 2009, which is incorporated herein by reference.

BACKGROUND OF THE INVENTION

1. Field of the Invention

The present invention relates generally to a method of adapting and repurposing used, spoiled, or excess thermal window glass units that would normally go to waste, into inexpensive new thermal solar energy collecting panels for the purpose of generating product hot water or for other heating or energy generation purposes.

2. Description of the Related Art

Thermally insulated dual pane windows have been used in new construction and remodeling for some years now. Typically, building codes mandate the use of such windows to reduce energy loss from homes and other buildings. Conditioning of air with fossil energy, whether the air is heated or cooled, can be wasted through contact with highly thermally conductive glass doors and windows. Heated air inside will be cooled due to cooler temperatures outside of a building, the heat energy being transferred conductively through cold glass windows and doors. Similarly, cooled air inside will be heated by contact with warmer glass exposed to hot temperatures outside. This temperature loss in buildings is typically most pronounced at windows and doors as walls are easier to insulate than openings. In the past, windows and sliding glass doors were single-pane glass, with a very low thermal resistance value (R value). Untreated glass is a good conductor of heat energy. Thermally insulated windows and glass doors improve the R value significantly and save a considerable amount of heating and cooling energy compared to single pane windows and sliding glass doors over the useful life of a building.

Glass "E" coatings can be applied in the manufacturing process to different faces of thermal window glass to increase their insulation effectiveness. These coatings can be designed to either reflect or absorb long-wave solar radiation, depending on the window design and the desired results. Reflecting thermal solar radiation will help to keep the interior of a structure cooler in the summer, while absorbing solar radiation will help to keep the interior warmer in the winter.

Thermal windows are formed by holding two or more panes of glass in a frame in way that they do not touch each other, thus avoiding conduction of heat energy from one glass pane to the other. The gap between the panes of glass is filled with a gas for increasing the thermal insulation of the window panes from each other. These spaces are sealed air-tight along the perimeter edges of the glass panes with a rubber like seal or gasket. In practice, the glass portions of thermal windows are often referred to in the industry and in this document as "Insulated Glass Units" or "IGUs." IGUs come in many dimensions from many manufacturing firms. An IGU held in a frame is an insulated window or insulated sliding glass door.

IGUs are limited to a useful lifespan of approximately twenty years. As the IGU ages, humid air enters the space between the window panes as the rubber gasket deteriorates and barometric pressure varies, resulting in a pumping effect. Higher atmospheric pressure squeezes the glass panes together, and lower atmospheric pressure relaxes the squeeze effect creating a partial vacuum, thus "pumping" humid atmospheric gas into the space between the glass panes through tiny leaks in the seal. Humidity within the space between the glass panes can build up, causing water to condense on the inner glass surfaces. Sodium bentonite granule packets or similar water absorbing materials may be hidden in the window frame of higher-grade IGUs to absorb such atmospheric humidity. This dehumidifying effect lasts until the water absorption material reaches its maximum water holding capacity. The trapped humid air eventually creates a fog which condenses on the sealed interior glass surfaces. This creates an unsightly foggy deposit that is quite visible, unattractive, and nearly impossible and extremely uneconomical to clean and correct. Additional wasted IGUs are a result of updating structures with newer, more efficient thermal window units.

Although it is theoretically possible to disassemble the thermal window, remove the rubber gasket, separate and clean the glass panes and reform the IGU with fresh gasket materials, such efforts are laborious and mechanically difficult and thus economically ineffective. It is difficult to adequately clean the interior glass surfaces, (which develops a well attached lime like deposit) install a fresh, functional gasket, re-introduce inert gas between the panes, while at the same time fully remove potentially humid air. Without the proper working conditions and equipment, this becomes an impractical exercise. While some procedures to clean the IGUs have even been patented, the practical solution in the glass industry remains removing and disposing of the old IGU and replacing it with a new IGU. Even when IGUs are disassembled and cleaned, such cleaning procedures are not always successful and the deterioration of the gasket is generally not addressed by cleaning procedures.

The result is that many spoiled IGUs with fog and/or lime deposits on the interior surfaces between the panes of glass are normally wasted and replaced with new IGUs. Even recycling the used glass in old IGUs by melting them down is frustrated due to contamination of such glass by the well attached rubber gasket, which is very hard to fully remove and the "E" coatings on the glass are also considered contaminants. Bits of rubber gasket contamination in a large batch of molten glass spoils the entire batch for most uses. Consequently, most IGUs are discarded. Glass industry experts project that as many as 10,000,000 used IGUs are discarded every year in the United States. Discarding used glass units also wastes the energy it takes to replace them. Even melting used glass down and re-using it as molten glass only saves about 50% of the energy required to cast new glass and is problematic as stated above. Adding to the mass of spoiled and used IGU introduced to the landfills are older, functioning IGUs which are being replaced with more modern or more efficient windows by the window replacement industry.

Thermal solar panels used to heat domestic water consist of a glass cover plate, a thermal collector plate, a fluid circulation channel attached to the collector plate, an encompassing frame and gaskets to hold the panel parts together and typically, insulation behind the solar panel to prevent thermal losses through the back of the panel that would otherwise be captured by the collector. Thermal solar panels trap and transform long wave heat energy from the sun into useable hot water. Thermal solar panels are at the forefront when considering economic renewable energy sources and sustainable building practices. Using thermal solar panels to decrease the required heat energy that is consumed in a building, without relying on the burning of limited fossil fuels, is a step towards reducing carbon emissions and eliminating energy waste.

Solar panels operate by absorbing long wave heat energy in the sun's rays. To do this, a solar panel generally employs a flat or matt textured dark substance as a collector plate which is better suited for absorbing solar radiation than a light-colored, reflective substance. Thermal solar panels can be made of any heat conducting dark substance.

A typical solar hot water installation, often referred to as a "thermal solar system", uses heat energy from the sun to heat a fluid, which is in turn used to move heat collected in the panel array to be concentrated in a fluid heat storage vessel or tank. The process involves progressively heating a body of water in a hot water tank. Solar hot water panels are installed on the rooftop or other suitable location with access to direct sunlight. Each panel contains a dark colored absorber plate complete with fluid circulation means in conductive contact with the plate. Thermal Solar systems commonly provide supplemental heat as the water tanks used for storage of the product hot water are typically electric or gas heaters to provide hot water at all times. Solar panels can't collect heat energy without direct access to sunlight, and so the thermal solar system heats the water when sunlight is available, and the electric or gas system heats the water when sunlight is absent. Thermal solar heat energy collected from panels may be used to heat hot water, heat air, heat a building slab for radiant heating or other purposes.

The fluid circulation loop means includes a pipe system running from the storage tank to the panels and back from the panels to carry the heated water or heated thermally conductive fluid from the solar panel array to a place where it can be stored or used. Hotter water from the solar array tends to rise to the top of the storage tank and cooler water tends to sink to the bottom of the storage tank. Cooler water from the bottom of the tank is sent to the solar array. This effect of convection in the water column tends to concentrate heat energy. A small electrical circulation pump controlled by an electronic differential controller powers the circulation loop that concentrates the heat. A heat exchanger may be employed in the loop to transfer heat from the hot circulating thermal fluid, such as glycol/water or oil and then circulate the cooled thermal fluid back to the solar hot water array to be reheated. The product hot water is in conductive contact with surfaces in the heat exchanger and is thus progressively heated. The use of a heat exchanger is advantageous during freezing weather because a glycol/water fluid is less susceptible to freezing, whereas product tap water might freeze within the panels, causing it to burst due to expansion. However, any transfer of heat across a heat exchanger will slightly lower the efficiency of the system, and this loss of efficiency must be taken into account.

Food grade glycol with positively charged carbon in suspension may be a heat absorbing member or collector plate of a solar panel. Food grade corn Glycol offers advantages in case a leak in the heat exchanger allows some glycol to enter the potable water. A person who accidentally ingests diluted food grade glycol will not suffer injury as might occur with regular glycol. Anti-freeze as the heat absorption fluid protects the panels from damage in freezing weather but slightly reduces the effectiveness of plain water. Oils may also be used for the thermally conductive fluid in a thermal solar installation.

The loop cycle of heating the fluid, thermal energy extraction, and sending the cooler fluid back to absorb more heat energy is begun anew with each sunrise and lasts throughout the solar day for the effective life of the thermal solar hot water system. A heat sensor on the panel array is wired to operate the electrical differential controller device used to turn off the electrical circulation pump when the sun goes down or when the heat in the tank exceeds the temperature of the panel array. Alternatively, a small photovoltaic solar panel may be used to power the fluid circulation pump when solar energy is available.

It would be economically and environmentally advantageous to make good use of previously unusable spoiled IGUs currently being placed in landfills by converting them into inexpensive solar energy collecting panels. Heretofore, there has not been a method described like the one presented here.

SUMMARY OF THE INVENTION

In the practice of the present invention, a used or excess new insulated thermal window is repurposed to act as a thermal solar panel. The process of repurposing the window unit requires disassembly of the old window, identifying and marking the former inside facing pane of glass, then removing at least one side of the gasket holding the windows panes together, installing a conduit, heat exchanger fluid, or pouring a solid black body substance, such as an asphalt plate, with fluid circulation means between the glass panes, then resealing the glass panes and framing the glass sandwich with a new miter cut extruded aluminum with mastic seal, insulating the back of the solar panel and adding a backing plate completes the process. The gasket does not have to be removed, and alternatively holes can be drilled into the gasket for filling the internal space. The solar energy collection surface is in thermally conductive contact with a fluid loop passage provided between a hot water storage tank and the panel array. For conversion from using an IGU in a building as a glazing member to use in a solar panel, in the disclosed invention, the glass should be inverted to orient the "E" coatings in such a way as they help rather than hinder the heat energy absorbing process. The face of the (insulated glass unit) IGU that was facing inside the building is oriented to face the sun when the IGU is used as a solar panel.

One embodiment of the invention relates to filling the gap between the glass panes of an old IGU with a glycol/water fluid with positively charged carbon black particles in suspension. Another embodiment of a low tech, inexpensive collector plate might be a long length of flexible tubing inserted between the panes of glass and then a dark liquid asphalt or resin material is poured in liquid form to harden in the remaining space between the glass panes. Thus the collector plate, which is commonly relatively costly copper plate or foil with copper tubing soldered on for circulation means, is replaced with a black fluid or inexpensive material which directly absorbs the heat energy at the solar panel and transmits the collected energy when the fluid is looped back to a heat exchanger in conductive contact with the product water. The tubing might be an inexpensive high temperature extruded plastic tube instead of costly copper tubing. The relatively poor conductivity of the plastic tube material as compared to highly conductive copper is overcome by adding considerably more length in the case of the plastic. The added soft tube length also offers a large soft potentially compressible mass within the glass gap which would help prevent freezing damage due to the expansion of almost any material used in the collector plate. The soft, but strong, silicone seal holding the solar panel together also allows for expansion of the gap between the glass elements without breaking the plate glass. Even aquariums are constructed of such silicone sealant and glass alone. Some silicone sealants are designed for long term exposure to UV radiation and high heat without losing the flexible but strong adhesiveness of the material cured on glass surfaces.

BRIEF DESCRIPTION OF THE DRAWINGS

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
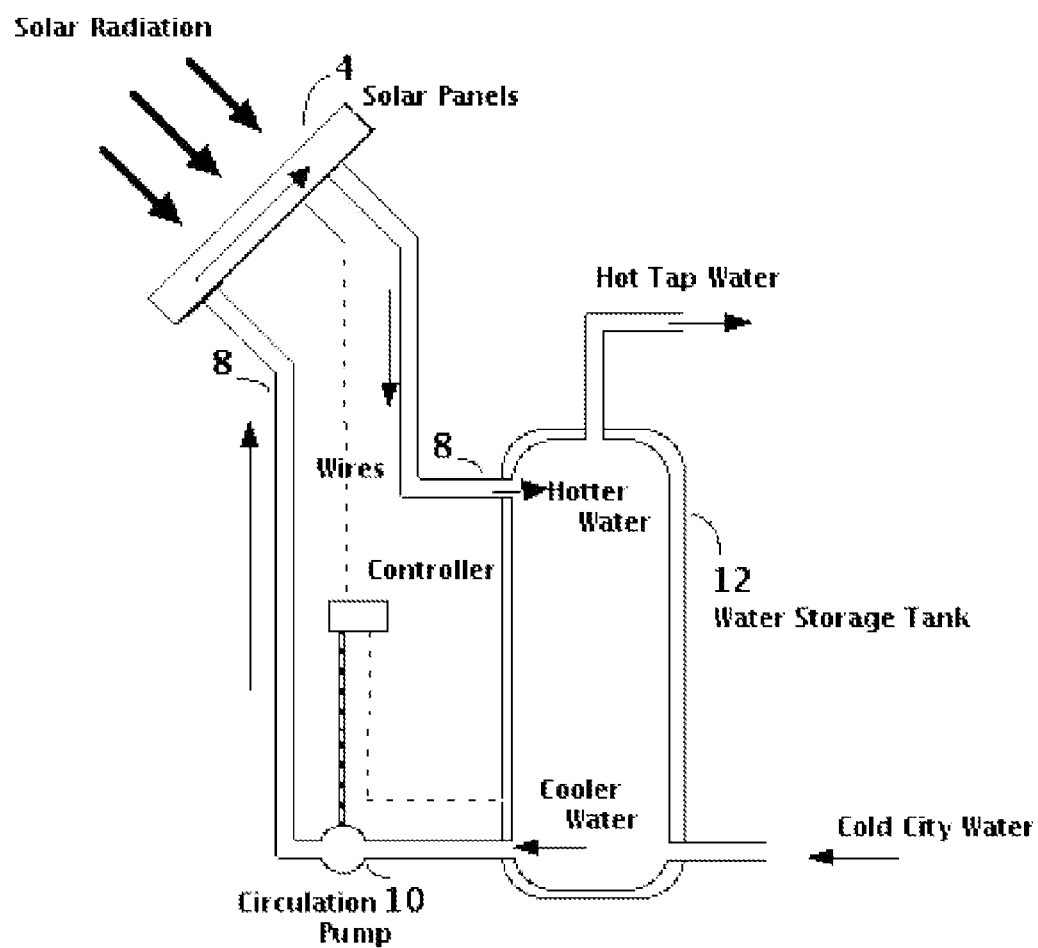
FIG. 1 is a diagram showing a repurposed insulated thermal window as a thermal solar panel being placed in an environment and inter-connected to a circulation pump and hot water storage tank.

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Said terminology will include the words specifically mentioned, derivatives thereof and words of similar meaning.

Thermal solar collectors are theoretically merely a heat energy absorbing member exposed to thermal radiation from the sun that is in conductive contact with fluid to be heated. Solar panels typically employ new glass similar to that used in the new thermal windows mentioned above, but may be a special low lead type solar glass, which only slightly increases solar heat energy absorption. Solar panel construction is always a trade off comparing the cost of parts versus the effectiveness and life expectancy of the resulting solar panel. A slightly less efficient panel sold at a much reduced price is economically desirable. Often there is unused space to mount additional solar panels in a typical solar installation to bring the total BTU yield up to the required level. The actual yield of BTUs per dollar spent is a valid basis upon which solar panels are rated. For example, a solid gold solar energy collector plate with diamond parts might be the most efficient solar panel possible per square inch, but would also be the most costly solar panel imaginable. However, copper or aluminum plates are fairly close to gold or silver collector plates in their ability to conduct heat energy. Even copper use is reduced whenever possible due to material cost considerations. New low-lead glass versus old plate glass is a similar cost/performance consideration. While brand new low lead solar glass might increase panel efficiency slightly compared to a used IGU made with common plate glass or tempered glass, the cost comparison for the BTU yield makes the used IGUs economically desirable. Reducing the cost of solar thermal panels is a well known goal of the solar industry and government agencies.

Some "solar panels" are a set of silicone cells which are solid semiconducting wafers, connected electrically to one another. Solar panels producing electricity do not function in the same manner as hot-water producing solar panels, but the present invention can repurpose thermal windows into a useable protective guard to contain electrical photovoltaic solar panels. A thin film photovoltaic material may be placed inside the open space in an old IGU to protect them from damage and provide a protected rigid mounting surface. Alternatively, the above-mentioned silicone cells may be placed directly between the two glass panels, shielding them from damage. However, the preferred embodiment of the present invention focuses on repurposing IGUs for heating water.

In addition to the advantages to the environment and the economic advantage in re-using old glass, additional energy is saved with the present invention because the glass element of new solar panels are not shipped to a central facility to be built into solar panels, and then shipped again to a remote location for installation, as in the current solar panel production model. The major investment in solar panel production facilities, transport costs, increased part costs, and overhead, is factored into the cost of each conventional solar panel sold. Reducing panel part prices by using free glass, eliminating expensive copper collector plates and decentralizing production can reduce solar panel prices considerably.

While the focus of this invention is re-using older waste IGUs, due to minor defects and production errors in the industry, new IGUs are sometimes also available for purchase at next to no cost. Most used or excess IGUs are disposed of by glass industry at a cost for disposal. For example, those persons willing to haul the used or excess waste glass away are often given that glass for free or at a very minor cost. This method of creating solar panels can potentially create a market for currently wasted glass, while at the same time reducing the cost of solar panels to the consumer and creating low tech green jobs.

Referring to the drawings in more detail, connection pipelines 8 inter-connect the circulation passage between the panes of glass containing water or some other suitable liquid for heat transfer, carry the liquid from the solar panel 4 through a circulation pump 10, into a storage tank 12 and the pipelines form a loop back to the solar panel array. The pump 10 will run until instructed to turn off by the controller. The controller may respond to a photovoltaic panel which can sense when solar energy is present or to some other command. The storage tank 12 may also be connected to a boiler or water heater powered by another energy source. Hotter water introduced to the water storage tank 12 rises and cooler water sinks so that removing water from the lower portion of the water column in tank 12 and then sending it to the solar array 4 and returning it to the tank 12 in a warmer condition tends to concentrate the heat energy collected.

The circulation pump 10 provides direct fluid circulation interface with the solar panels 4 and the storage tank 12, and gives operational control with on and off options over the solar system to advantageously turn the system on in sunny conditions and off in less sunny conditions. The liquid is thus cycled via a loop through the conduit 6 from the water tank 12 as the heat energy is concentrated. In a preferred embodiment, the conduit 6 will be coiled throughout the space 28 between the panes 16, 22. A differential controller device compares the temperature of the solar array and the temperature of the hot water tank. Should the temperature of the solar panel array become similar to the hot water tank's temperature the controller device turns the power to the circulation pump 'off.' Should the controller device later determine that the panel array is hotter than the water in the storage tank, the controller turns the circulation pump back 'on.'

FIG. 1 depicts a schematic environmental view of a solar panel 4 array, circulation pump 10, controller, and water tank 12. The water tank may be a typical electric- or gas-powered water heater unit, or another type of water storage device. The system may optionally contain a heat exchanger if the fluid inside of the pipes 8 is not useable tap water. The system shown in FIG. 1 is a typical setup for a hot-water solar panel system in a residence or other structure. However, due to the method of transforming a used IGU into a solar panel 4, a cost savings can be achieved and waste that would otherwise end up in a landfill is avoided.

II. Repurposed IGUs as Solar Panels

Figure 2:
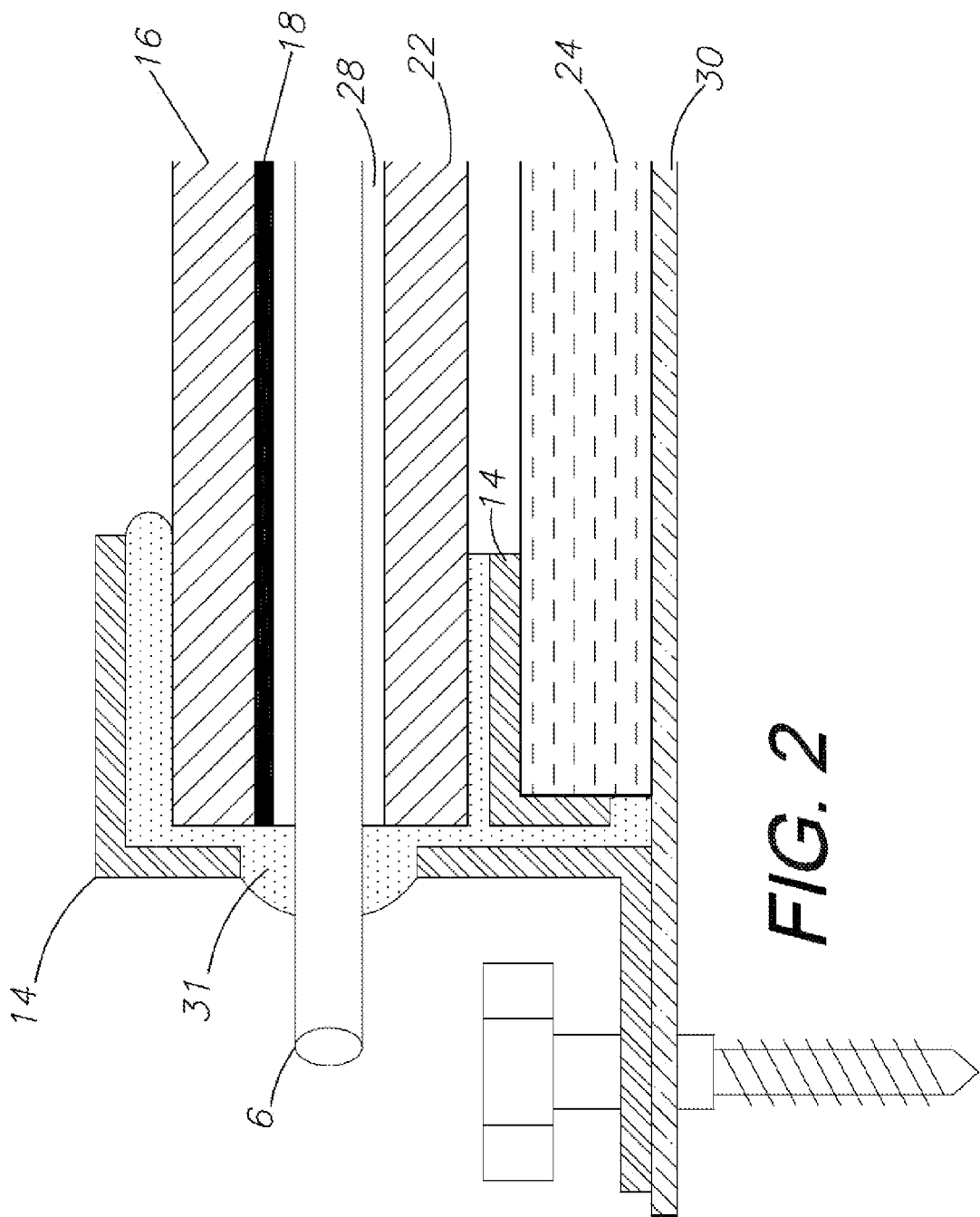
FIG. 2 is a cross-sectional view of a repurposed insulated thermal window unit, demonstrating the interaction between the various layers present after the unit is repurposed into a thermal solar panel.

FIG. 2 depicts the various layers of a solar panel 4 after being transformed from an IGU. The original IGU contained an interior glass pane 16 and an exterior glass pane 22 sandwiched around an open space 28. When the IGU is disassembled, the interior space 28 is fitted with a conduit 6 containing at least two taps 20 or an alternative collector element, allowing the conduit 6 to be interconnected to a loop system of pipes. FIG. 2 depicts the interior pane 16 as containing a film 18 painted or affixed to the surface facing the interior space 28 between the panes 16, 22. This film 18 may be a special long wave energy absorbing coating material. The film or solar selective coating 18 may be on any surface of either pane 16, 22 as demonstrated in FIGS. 4-7. The heat energy absorbing material may be a black liquid or even a solid poured black body, which in any case has a fluid channel to allow circulation of the fluid though the energy absorbing element.

A layer of insulation 24 is placed against the exterior pane 22. This foam insulation ensures that heat striking the solar panel 4 does not escape through the exterior back of the glass panel 22 or the entire panel 4. A backboard 30 is affixed to the bottom of the insulation 24 for protection and to contain it within the assembly of the solar panel 4.

A frame 14 contains the entire assembly. The frame 14 is attached by elastic mastic adhesive means 31, such as high temperature silicone sealant to the edges of the solar panel 4 where the original gasket was removed. The frame 14 is designed to contain all layers of the panel 4 and to provide a mechanically strong means to affix the entire panel 4 to a roof or other portion of a structure or other mounting surface while allowing for expansion of the space between the glass panes in case of expansion on the heat absorbing element because of freezing conditions.

Figure 3:
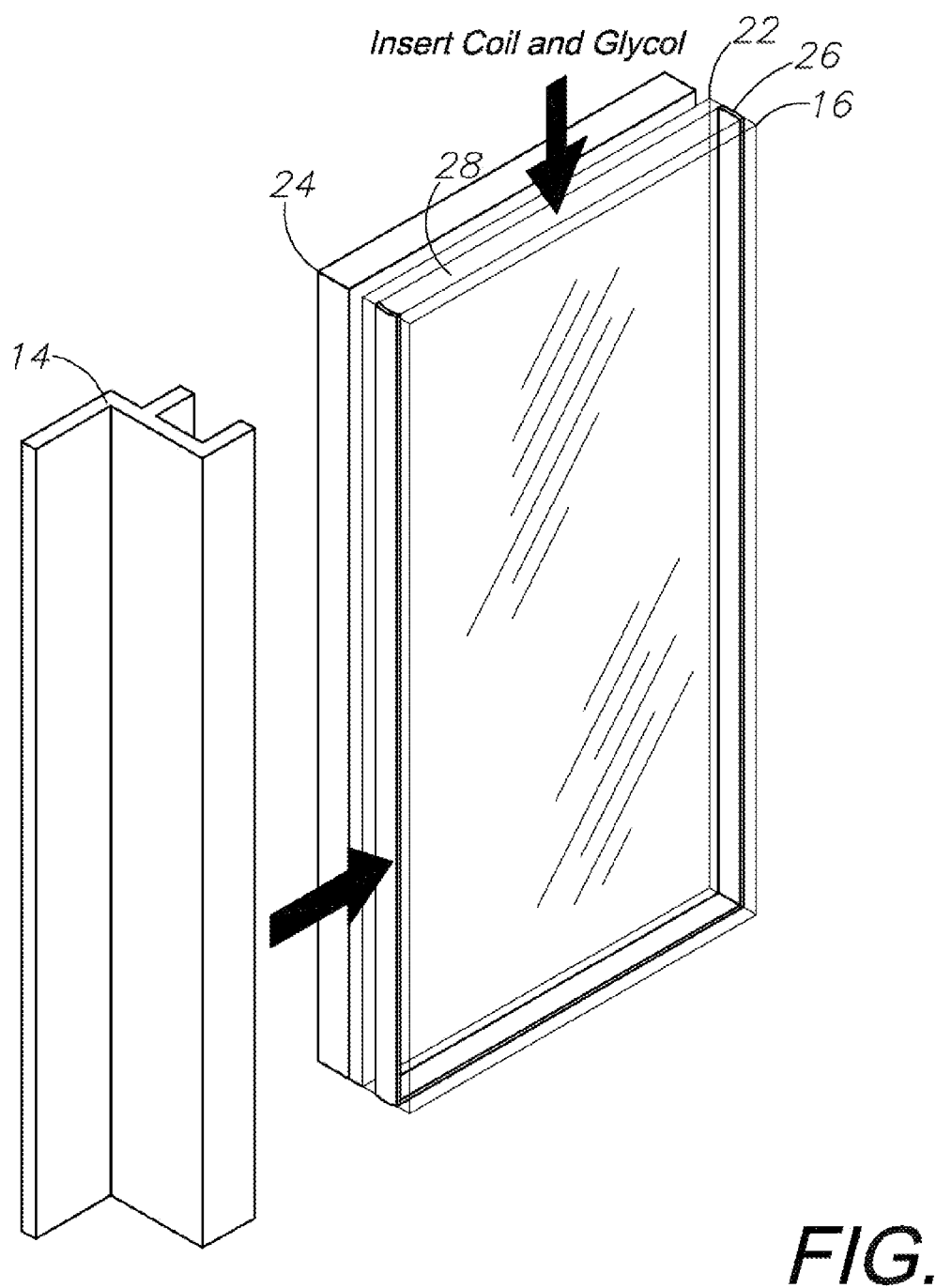
FIG. 3 is an isometric view of a repurposed insulated thermal window unit showing a sealed pair of glass panes with an exposed edge, and demonstrating how a thermal solar panel is formed from the repurposed window unit.

FIG. 3 is an isometric drawing of an IGU. The IGU is comprised of an interior panel 16 and an exterior pane 22 with a space 28 between the two panels. The panes 16, 22 are joined together by a gasket 26 made of a rubber or other similar material. The gasket 26 is removed or opened from one side, as demonstrated in FIG. 3. In the preferred embodiment, the heat absorbing member with a fluid circulation conduit 6 is placed between the panes 16, 22, and the remaining space 28 is filled with a dark liquid fluid such as food grade glycol water mix with positively charged carbon black in suspension or similarly suitable substance for transferring heat to the conduit 6 without fear of freezing at normal outside temperatures.

Figure 4:
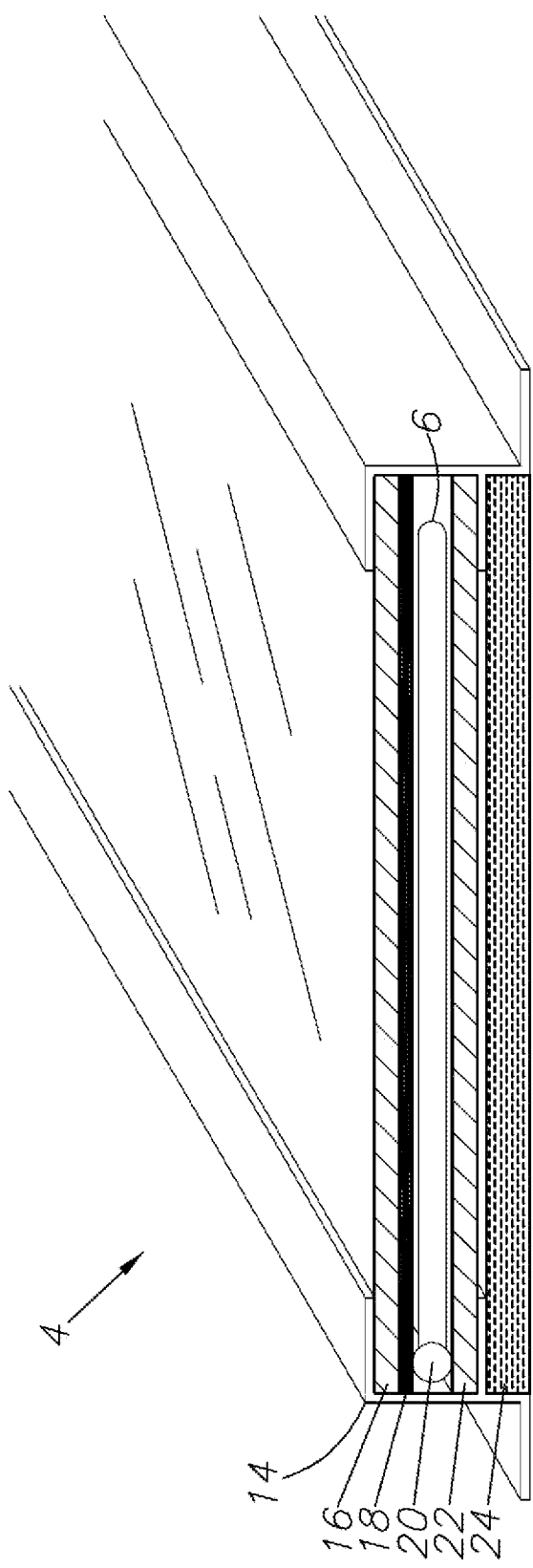
FIG. 4 is an isometric view of a repurposed insulated thermal window unit showing the interaction and construction of the various layers necessary to create thermal solar panel.

FIG. 4 is an isometric view showing the construction of the panel 4 as it would be viewed by the user. The layers presented in FIG. 2 are present here as well. It should be noted that the conduit 6 shown in FIGS. 2 and 4 could be replaced by merely filling the space 28 between the panes 16, 22 with water or another liquid substance and merely piping this liquid through the space and out the other side once heated.

The layout shown in FIGS. 2 and 4 may alternatively be assembled with the film layer 18 on different or multiple faces of the glass panes 16, 22. Additionally, any embodiment may or may not contain a glycol solution or similar fluid within the panel 4, whereby the conduit 6 with a metal heat energy absorber plate is merely heated due to direct radiation from the sun, rather than increased heat absorbed by the glycol solution. However, using the glycol solution will generally be the preferred method and may be used in conjunction with a metal plate where convention of the liquid solution transfers heat energy to the conduit 6 to be removed from the panel and sent to the storage tank.

III. Operation of the Preferred Embodiment

There are two basic techniques available from the described method 2. As discussed above, the first method involves flooding the internal space 28 between the panes of glass 16, 22 with a heat transfer fluid, such as liquid glycol/water solution, and ducting that heat transfer fluid through the panel cooler and ducting it out at a warmer temperature due to the heat energy gathered from exposure to the sun.

The advantages of this first technique, wherein the entire internal space 28 is flooded with an antifreeze black heat transfer solution, is a cost savings by reducing collector plate and fluid circulation parts necessary to construct the overall panel 4. The heat transfer fluid could be product hot water; however, a disadvantage to that solution would be that tap water freezes in low atmospheric temperatures. Additionally water pressure in the panel may fluctuate if attached to a city water line, causing the panel to burst. A third problem with filling the space with product water would be the growth of algae within the panel 4, causing a loss of solar absorption.

As mentioned above, a thermally conductive fluid, such as a glycol, oil, or an antifreeze/water mixture, could be used instead of product water to prevent the above disadvantages. Using an internally contained liquid would solve the problems of freezing, pressure, and algae growth, but would require the additional inclusion of a heat exchanger to transfer heat from the non-freezing liquid to useable water. Alternatively, if freezing and pressure are not an issue, the upper interior pane 16 could be painted with a black selective paint to create a hot body while blocking light from the panel which would prevent moat algae growth in a product water system.

The steps necessary to perform this first technique are as follows: first, a spoiled or new IGU comprised of an interior 16 and exterior 22 pane sealed with a gasket 26 is disassembled and perhaps thoroughly cleaned. Two parallel edges of the IGU are selected as the "top" and "bottom" and the former exterior pane 22 is marked as such. A plurality of holes may be drilled through the sealed rubber gasket 26 on the top and bottom edges of the IGU. The vertical edges perpendicular to the "top" and "bottom" edges chosen earlier are affixed with silicone or a similar product to seal any leaks that may have appeared in these edges. Pipe attachments are sealed into the top and bottom edges, which are then also sealed with silicone or another sealant 31. All edges are affixed with an extruded frame member 14. If desired, the faces of the panes 16, 22 can be painted with a black selective paint to increase the ability to absorb solar radiation. An insulation layer 24 is placed against the exterior pane 22 and is sealed with a backing cover 30. The panel can then be installed on a structure. Water or another suitable liquid is piped into the panel 4 via pipe taps extending through the seal 26 located on the top and bottom of the panel 4, the taps being connected to the loop piping system 8. The liquid will be heated inside of the panel 4 and piped out the other end, where the heat energy will be circulated throughout the system back to the storage tank to be concentrated due to stratification of the cooler water going to the bottom of the storage tank and hotter water rising to the top of the storage tank.

The second technique available using the described method is to leave open one side of the IGU and insert a hollow conduit 6 or black body device to absorb solar radiation, and provide a duct to pass heat transfer fluid through the panel, without flooding the entire space between. This is the example shown in FIGS. 2 and 4. The conduit 6 is placed between the two panes of glass 16, 22 and the taps 20 are connected to the system's liquid pipe lines 8. Again the panes 16, 22 surfaces may be painted black to increase solar radiation absorption. Water or another heat transfer liquid are heated within the conduit or black body and piped through the system in the same manner as performed in the first technique.

It should be noted that if a reflective film was initially found on any surface of either pane 16, 22, that surface should be pointed to face in the direction of the back of the panel. In other words, the reflective surface should be pointed away from the sun on the internal pane 16. Such reflective films prevent solar radiation from being absorbed and should be placed where the effect of that film is nullified.

IV. Business Method Embodiment

A low tech "Cottage Industry Solar Shop" business method and system to re-use waste IGUs consists of the following: 1. Researching, developing, documenting and patenting the best possible design for converting used wasted IGUs into useful thermal solar panels; 2. Training people to convert the old glass units into new solar panels using a well defined system; 3. Training licensees of the technology in how to install such thermal solar systems; 4. Licensing patented IGU conversion technology, quality control systems and trademarks to such trained individuals; 5. Providing specific unique parts such as custom extruded and miter cut-to-length aluminum frame parts ordered to convert specific used glass units into a new solar panel via an online store; 6. Develop and operate a central online store and facility, (CottageIndustrySolar.com) which ships the mitered, cut-to-length aluminum frame parts, glycol, silicone mastic, and other custom pieces as an IGU conversion kit; 7. Provides other specialized conversion elements to the remote licensee; 8. Provide National Solar Rating Certification certificates based upon licensees using the licensed procedures and quality control procedures; 9. Solar ratings based upon BTUs/square inch of panel aperture provide for tax credits for the consumer; 10. Provide a warranty assurance program for all panels created by trained licensees; 11. Facilitate and promote an affordable franchise licensing business methods for construction of new solar panels from used glass units and certify the installation thereof; 12. Provide IGU conversion procedures and parts for sale online to the general public, less rating certificates and trademark licensing.

The above disclosed scenario reduces the energy footprint of solar panel manufacturing dramatically while also presenting economic opportunity for many people to use low tech tools and licensed techniques to produce and install thermal solar systems in remote locations. Window replacement firms, glass companies and waste disposal companies might find an additional income stream by recycling the used glass they are already wasting or a market for used glass might develop stopping the wasteful disposal of all that glass. There is a lot of profit to be made in producing new solar panels to be sold or installed. Mom and Pop "cottage industry solar shops" will present a very green business opportunity that ordinary persons can launch in their garages with a minimum of specialized tools and a minimal investment for training and setting up shop. The combination of re-using wasted IGUs, creating cheaper thermal solar panels, reducing the energy used for the shipping of heavy glass to and from a central location, the economic benefits and the long term energy savings of an installed base of these converted IGU solar panels represents a tremendous green potential to the United States.

It is to be understood that while certain aspects of the disclosed subject matter have been shown and described, the disclosed subject matter is not limited thereto and encompasses various other embodiments and aspects. The above-mentioned steps and components are not meant to limit the use or organization of the present invention. The steps for performing the method may be performed in any logical method and in any logical order. The purpose of the invention is to use waste IGUs in the best possible configuration to create inexpensive thermal solar panels.

Having thus described the invention, what is claimed as new and desired to be secured by Letters Patent is:

1. A method of repurposing an insulated thermal glass window unit comprised of an interior pane with an interior and exterior surface, an exterior pane with an interior and exterior surface, an interior space between said panes being faced by said interior face of each of said panes, and a gasket sealing all edges of the two panes around said interior space into a solar heat energy absorbing panel, which method comprises the steps of:

disassembling the thermal glass window unit such that the interior pane and exterior pane are disconnected from each other along at least part of one edge of the interior and exterior panes;

opening the gasket;

inserting first and second pipe sections through said gasket at first and second locations on a perimeter of the unit;

resealing the edges of said panes and providing a fluid tight seal around the interior space and around said inserted pipe sections;

placing a frame around the perimeter of the unit;

attaching insulation to said exterior face of said formerly exterior glass pane to form a bottom surface to the solar panel; and forming a fluid-conducting space between said panes adapted for receiving lower-temperature fluid from the first pipe section and discharging heated fluid from the second pipe section.

2. The method of claim 1, which includes the additional step of painting said internal face of said internal pane with a solar radiation-absorbing black paint.

3. The method of claim 2, which includes the additional step of painting said internal face of said external pane with a solar radiation-absorbing black paint.

4. The method according to claim 1, which includes additional steps of:

acquiring discarded glass units;

training individuals on how to disassemble, clean, and repurpose said acquired glass units into useable thermal solar panels;

training individuals to install said repurposed IGUs into new or existing solar heating system loops; and installing said repurposed units in said solar thermal heating system loops.

5. The method according to claim 1, which includes the additional steps of:

providing common, unitary parts designed to quickly and effectively repurpose a used glass unit into a working thermal solar panel; and supplying end-users with said common, unitary parts.

6. The method according to claim 1, including:

licensing the technology of repurposing used glass units to other individuals; and supplying said individuals with said common, unitary parts for quickly converting a glass unit into a working thermal solar panel.

7. The method according to claim 1, including:

transforming captured thermal energy into electricity for common usage; and routing said electricity into the attached structure's electrical system.

8. The method according to claim 1, which includes the additional step of painting said internal face of said internal pane with a solar radiation-absorbing black paint.

9. The method according to claim 1, which includes the additional step of painting said internal face of said external pane with a solar radiation-absorbing black paint.

* * * * *